US012789551B2

(12) United States Patent
Ye

(10) Patent No.: US 12,789,551 B2
(45) Date of Patent: Nov. 10, 2026

(54) WIND-BREAKING RIM, WHEEL AND BICYCLE

(71) Applicant: Xiamen Baishi Baixing Brand Management Co., Ltd., Xiamen City (CN)

(72) Inventor: Jinji Ye, Xiamen City (CN)

(73) Assignee: Xiamen baishi Baixing Brand Management Co., Ltd., Xiamen City (CN)

( * ) Notice: Subject to any disclaimer, the term of this patent is extended or adjusted under 35 U.S.C. 154(b) by 278 days.

(21) Appl. No.: 18/619,478

(22) Filed: Mar. 28, 2024

(65) Prior Publication Data

US 2025/0115077 A1 Apr. 10, 2025

(30) Foreign Application Priority Data

Oct. 8, 2023 (CN) ......................... 202322690999.4
Nov. 22, 2023 (CN) ......................... 202323161943.6
Feb. 4, 2024 (CN) ......................... 202410161217.4

(51) Int. Cl.
*B60B 21/02* (2006.01)
*B60B 1/04* (2006.01)
*B60B 21/06* (2006.01)

(52) U.S. Cl.
CPC .......... *B60B 21/028* (2013.01); *B60B 21/025* (2013.01); *B60B 21/062* (2013.01); *B60B 1/041* (2013.01); *B60B 2360/3416* (2013.01); *B60B 2900/1216* (2013.01)

(58) Field of Classification Search
CPC ....... B60B 1/003; B60B 1/041; B60B 21/025; B60B 21/028; B60B 21/062; B60B 2360/3416; B60B 2900/1216
See application file for complete search history.

(56) References Cited

U.S. PATENT DOCUMENTS

| | | | | |
|---|---|---|---|---|
| 6,120,105 | A * | 9/2000 | Chern | B60B 21/04 301/95.104 |
| 9,186,718 | B2 * | 11/2015 | Alexandre | B60B 21/025 |
| 9,493,032 | B2 * | 11/2016 | Alexandre | B60B 21/00 |
| 9,511,626 | B2 * | 12/2016 | Alexandre | B60B 21/08 |
| 9,610,800 | B2 * | 4/2017 | Katsanis | B60B 1/0261 |

(Continued)

FOREIGN PATENT DOCUMENTS

| | | | |
|---|---|---|---|
| CN | 104070924 | A | 10/2014 |
| CN | 218577408 | U | 3/2023 |

(Continued)

*Primary Examiner* — Adam D Rogers
(74) *Attorney, Agent, or Firm* — COOPER LEGAL GROUP LLC

(57) ABSTRACT

The disclosure provides a wind-breaking rim, a wheel and a bicycle. The wind-breaking rim includes a plurality of rim wave profiles. The plurality of rim wave profiles extend from an inner ring spoke mounting portion to two rim side walls and are symmetrically distributed with a rim width center surface as a plane of symmetry. The plurality of rim wave profiles are continuously arranged to form an annular wind-breaking structure. The rim wave profiles include adjacent crest portions and trough portions. A rim inner ring and the rim side walls having wave profiles can greatly reduce wind resistance.

10 Claims, 14 Drawing Sheets
(2 of 14 Drawing Sheet(s) Filed in Color)

(56) References Cited

U.S. PATENT DOCUMENTS

| | | | | |
|---|---|---|---|---|
| 9,950,561 | B2 * | 4/2018 | Hall | B60B 21/04 |
| 10,611,188 | B2 * | 4/2020 | Katsanis | B60B 1/003 |
| 11,198,323 | B2 * | 12/2021 | Sheff | B60B 21/026 |
| 11,504,997 | B2 * | 11/2022 | Biancalana | B60B 3/10 |
| 11,673,422 | B2 * | 6/2023 | Yang | B60B 21/025<br>152/378 R |
| D1,102,353 | S * | 11/2025 | Ye | D12/208 |
| 2003/0127907 | A1 * | 7/2003 | Chen | B60B 21/062<br>301/55 |
| 2004/0066085 | A1 * | 4/2004 | Schiers | B60B 21/062<br>301/95.102 |
| 2024/0416677 | A1 * | 12/2024 | Meggiolan | B60B 21/02 |
| 2025/0388044 | A1 * | 12/2025 | Ye | B60B 1/0261 |

FOREIGN PATENT DOCUMENTS

| | | | | | |
|---|---|---|---|---|---|
| CN | 118893931 | A | * | 11/2024 | B60B 27/00 |
| CN | 120287753 | A | * | 7/2025 | B60B 1/042 |
| GB | 588782 | A | * | 6/1947 | B60B 21/02 |

* cited by examiner

WIND-BREAKING RIM, WHEEL AND BICYCLE

CROSS-REFERENCE TO RELATED APPLICATIONS

This application claims priority to Chinese Patent Application 202322690999.4, filed on Oct. 8, 2023, Chinese Patent Application 202323161943.6, filed on Nov. 22, 2023, and Chinese Patent Application 202410161217.4, filed on Feb. 4, 2024. Chinese Patent Application 202322690999.4, Chinese Patent Application 202323161943.6, and Chinese Patent Application 202410161217.4 are incorporated herein by reference.

TECHNICAL FIELD

The disclosure relates to the field of vehicle accessories, and in particular to a wind-breaking rim.

BACKGROUND

A bicycle wheel is the main component of a bicycle, and a rim is the main body of the bicycle wheel and the supporting component of the bicycle. At present, there are mainly two types of bicycle rims: stainless steel and carbon fiber. A carbon fiber rim is made by laminating pieces of carbon pre-preg impregnated with resin into a rim shape which is placed into a mold (an auxiliary tool for shaping the rim in the rolling process) and carrying out high-temperature pressure molding and curing (a process in which the rolled product reacts and sets in the mold cavity at high temperature and high pressure) for a period of time. A bicycle rim usually includes an annular tire mounting portion for mounting a tire, an annular spoke mounting portion for mounting spokes, and two annular side walls oppositely arranged between the tire mounting portion and the spoke mounting portion. At present, the two annular side walls in the prior art are usually designed to have ordinary curves, and the inner ring spoke mounting portion is in the shape of a smooth circle, such as CN104070924A. This type of rim is simple in design and process, but is incapable of producing a good wind-breaking effect due to its high wind resistance. In recent years, there are also rims whose annular side walls designed with wave structures, such as CN218577408U. This type of rim can reduce the wind resistance to some extent, but how two manufacture products that can further reduce the wind resistance has always been the pursuit of the industry.

SUMMARY

Therefore, in view of the above problems, the disclosure provides a wind-breaking rim, a wheel and a bicycle.

The disclosure adopts the following solutions:

The disclosure provides a wind-breaking rim, including an outer ring tire mounting portion for mounting a tire, an inner ring spoke mounting portion for mounting spokes, and two rim side walls oppositely arranged between the outer ring tire mounting portion and the inner ring spoke mounting portion. The wind-breaking rim has a rim width center surface in a rim width direction. The wind-breaking rim further includes a plurality of rim wave profiles. The plurality of rim wave profiles extend from the inner ring spoke mounting portion to the two rim side walls and are symmetrically distributed with the rim width center surface as a plane of symmetry. The plurality of rim wave profiles are continuously arranged to form an annular wind-breaking structure. The rim wave profiles include adjacent crest portions and trough portions.

In one example, the rim wave profiles extend from the inner ring spoke mounting portion to the rim side walls such that the inner ring spoke mounting portion and the rim side walls respectively form a concave-convex wave surface. An inner ring wave surface of the inner ring spoke mounting portion includes adjacent inner ring crest portions and inner ring trough portions. A side wall wave surface of the rim side wall includes adjacent side wall crest portions and side wall trough portions. The side wall crest portion is connected with the inner ring crest portion, and the side wall trough portion is connected with the inner ring trough portion.

In one example, the wind-breaking rim has a central axis of rotation. Crest lines of the side wall crest portions are radial arc curves around the central axis, and trough lines of the side wall trough portions are radial arc curves around the central axis. The radial arc curves are each a part of a logarithmic spiral or a part of a parabola.

In one example, crest lines of the side wall crest portions and trough lines of the side wall trough portions extend from the inner ring spoke mounting portion to the outer ring tire mounting portion. A height of the side wall crest portion gradually decreases as the side wall crest portion extends from the inner ring spoke mounting portion to the outer ring tire mounting portion, and a depth of the side wall trough portion gradually decreases as the side wall trough portion extends from the inner ring spoke mounting portion to the outer ring tire mounting portion.

In one example, the height of the side wall crest portion decreases to zero at the outer ring tire mounting portion, and the depth of the side wall trough portion decreases to zero at the outer ring tire mounting portion.

In one example, spoke mounting holes are each respectively located at the inner ring crest portions.

In one example, the outer ring tire mounting portion, inner ring spoke mounting portion and the two rim side walls form a cavity and are integrally formed.

In one example, the outer ring tire mounting portion, the inner ring spoke mounting portion and the two rim side walls are made of carbon fibers.

The disclosure further provides a wheel, including the wind-breaking rim described above and further including a hub and a plurality of spokes. The hub is located in a middle of the wind-breaking rim. A first end of each of the spokes is connected to or integrally formed to the hub, and a second end of each of the spokes is connected to or integrally formed to an inner ring spoke mounting portion.

The disclosure further provides a bicycle, including the wheel described above.

The technical solutions provided by the disclosure have the following technical effects:

1. According to the disclosure, the inner ring spoke mounting portion is provided with the plurality of rim wave profiles. The plurality of rim wave profiles extend from the inner ring spoke mounting portion to the two rim side walls and are symmetrically distributed with the rim width center surface as the plane of symmetry, and the plurality of rim wave profiles are continuously arranged to form the annular wind-breaking structure. The rim inner ring and the rim side walls having the wave profiles can change the flow direction of wind during riding, so that the air flows out along the side walls having the wave profiles, which can greatly reduce the wind resistance. Moreover, the appearance is novel and beautiful.

2. According to the disclosure, the rim wave profiles extend from the inner ring spoke mounting portion to the rim side walls such that the inner ring spoke mounting portion and the rim side walls respectively form a concave-convex wave surface. The inner ring wave surface of the inner ring spoke mounting portion includes the adjacent inner ring crest portions and inner ring trough portions. The side wall wave surface of the rim side wall includes the adjacent side wall crest portions and side wall trough portions. The side wall crest portion is connected with the inner ring crest portion, and the side wall trough portion is connected with the inner ring trough portion. The crest lines of the side wall crest portions are radial arc curves around the central axis, the trough lines of the side wall trough portions are radial arc curves around the central axis, and the radial arc curves are each a part of a logarithmic spiral or a part of a parabola, so that the air can flow out more smoothly along the side walls having the wave profiles, which can further reduce the wind resistance.

3. According to the disclosure, the height of the side wall crest portion gradually decreases as the side wall crest portion extends from the inner ring spoke mounting portion to the outer ring tire mounting portion and reaches its minimum at the outer ring tire mounting portion, and the depth of the side wall trough portion gradually decreases as the side wall trough portion extends from the inner ring spoke mounting portion to the outer ring tire mounting portion and reaches its minimum at the outer ring tire mounting portion. With this arrangement, the crests and the troughs at the outer ring tire mounting portion are more gentle and even reach zero, so that the wind resistance at the outer ring tire mounting portion is greatly reduced, which can further reduce the wind resistance of the whole rim.

4. According to the disclosure, the rim side walls of the wind-breaking rim are wavy and twisted, so that the cross section of the rim side walls are formed with a plurality of arch-shaped protrusions. Compared with a rim whose side surfaces are not wavy and twisted, i.e., a control rim whose side surfaces are flat, the bearing rigidity of the rim side walls of the wind-breaking rims can be greatly improved, while the material consumed and weight of the rim side wall are hardly increased or only slightly increased.

BRIEF DESCRIPTION OF DRAWINGS

The patent or application file contains at least one drawing executed in color. Copies of this patent or patent application publication with color drawing(s) will be provided by the Office upon request and payment of the necessary fee.

DESCRIPTION OF EMBODIMENTS

Figure 1:
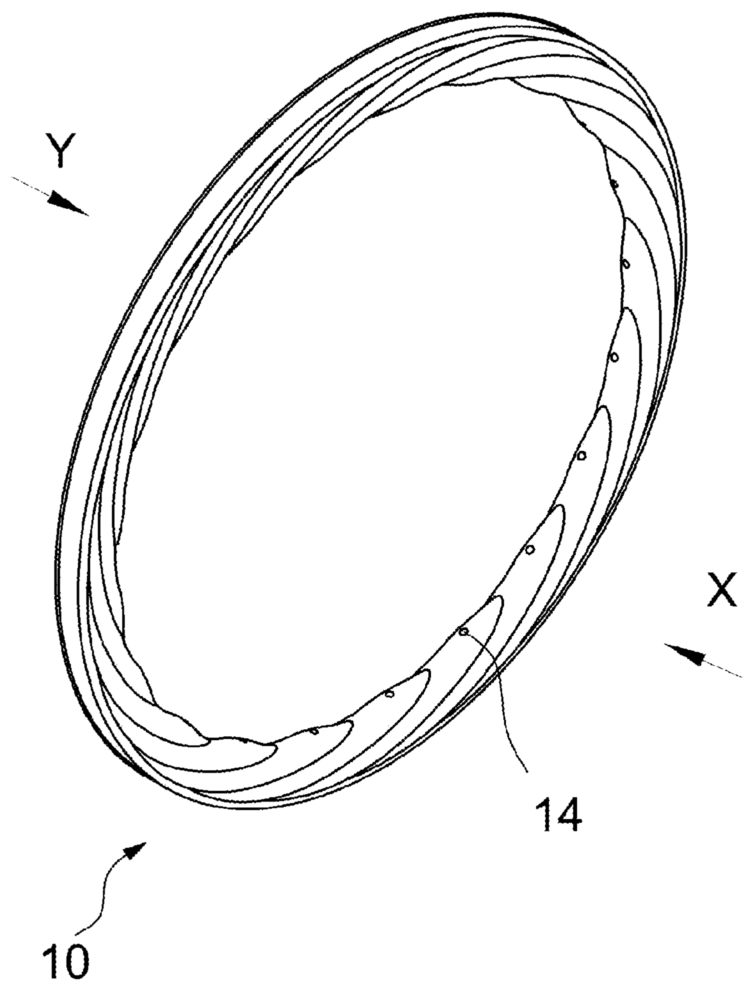
FIG. 1 is a three-dimensional view of a wind-breaking rim.

To further illustrate the examples, the accompanying drawings are provided in the disclosure. These accompanying drawings are a part of the contents disclosed in the disclosure that are mainly used to illustrate the exampled, and can be used in conjunction with the related descriptions in the specification to explain the operation principle of the examples. With reference to these contents, those of ordinary skills in the art should be able to understand other possible implementations and advantages of the disclosure. Components in the drawings are not drawn to scale, and like component symbols are usually used to represent like components.

The disclosure will be further described in conjunction with the accompanying drawings and specific implementations.

As shown in FIG. 1 to FIG. 9, the disclosure provides a wind-breaking rim 10, including an outer ring tire mounting portion 11 for mounting a tire, an inner ring spoke mounting portion 12 for mounting spokes, and two rim side walls 13 oppositely arranged between the outer ring tire mounting portion 11 and the inner ring spoke mounting portion 12. The outer ring tire mounting portion 11, the inner ring spoke mounting portion 12 and the two rim side walls 13 form a cavity, and preferably, are integrally formed and made of carbon fibers. The wind-breaking rim 10 further includes a plurality of rim wave profiles 102. The rim wave profiles 102 include adjacent crest portions (1211, 1311) and trough portions (1212, 1312). The wind-breaking rim 10 has a rim width center surface 101 in a rim width direction. The plurality of rim wave profiles 102 extend from the inner ring spoke mounting portion 12 to the two rim side walls 13 and are symmetrically distributed with the rim width center surface 101 as a plane of symmetry, as shown in FIG. 1 to FIG. 5. The plurality of rim wave profiles 102 are continuously arranged to form an annular wind-breaking structure. The rim inner ring and the rim side walls having the wave profiles can change the flow direction of wind during riding, so that the air flows out along the side walls having the wave profiles, which can greatly reduce the wind resistance. Moreover, the appearance is novel and beautiful.

Figure 2:
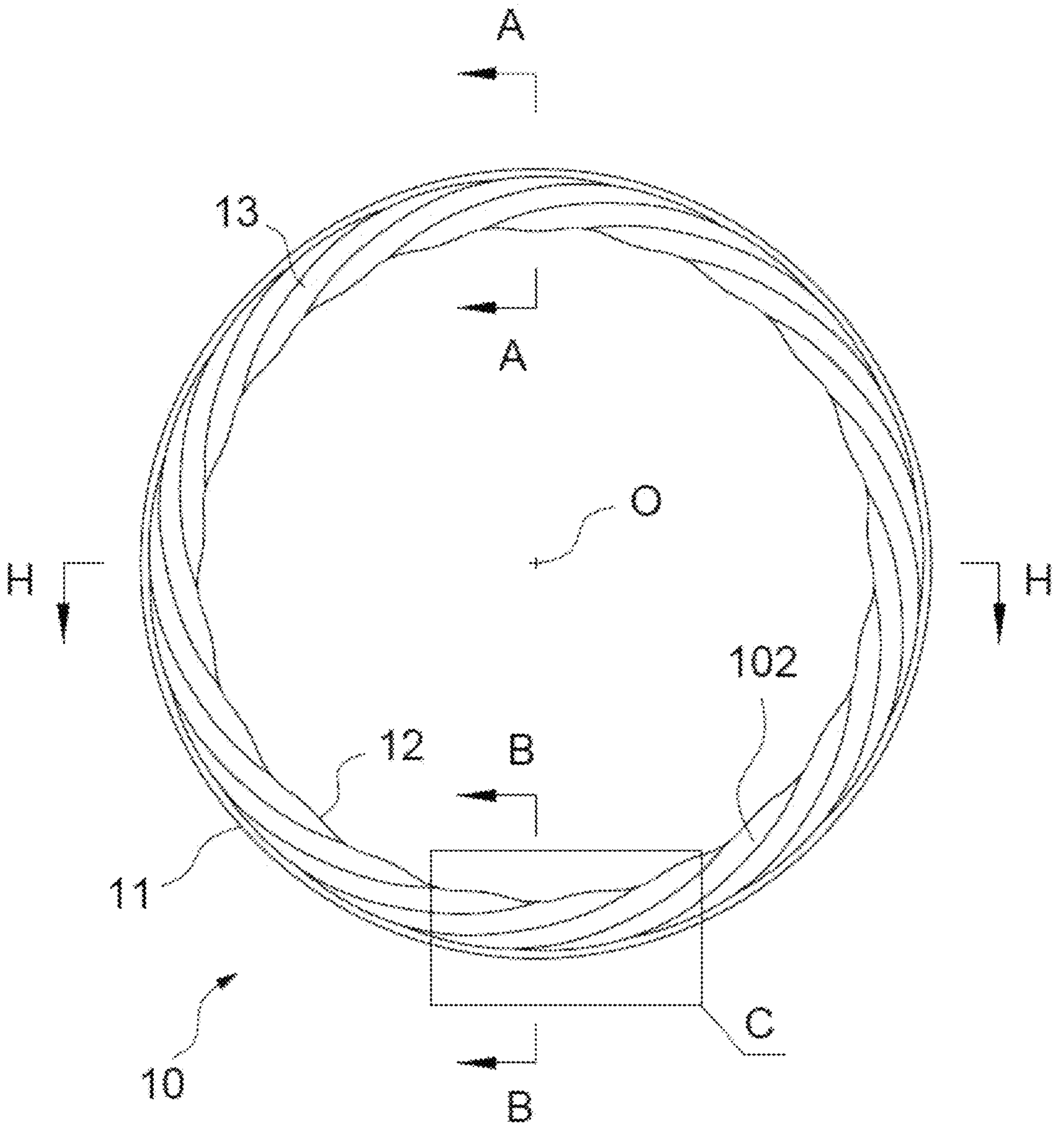
FIG. 2 is a view of the wind-breaking rim along the X direction in FIG. 1.
Figure 3:
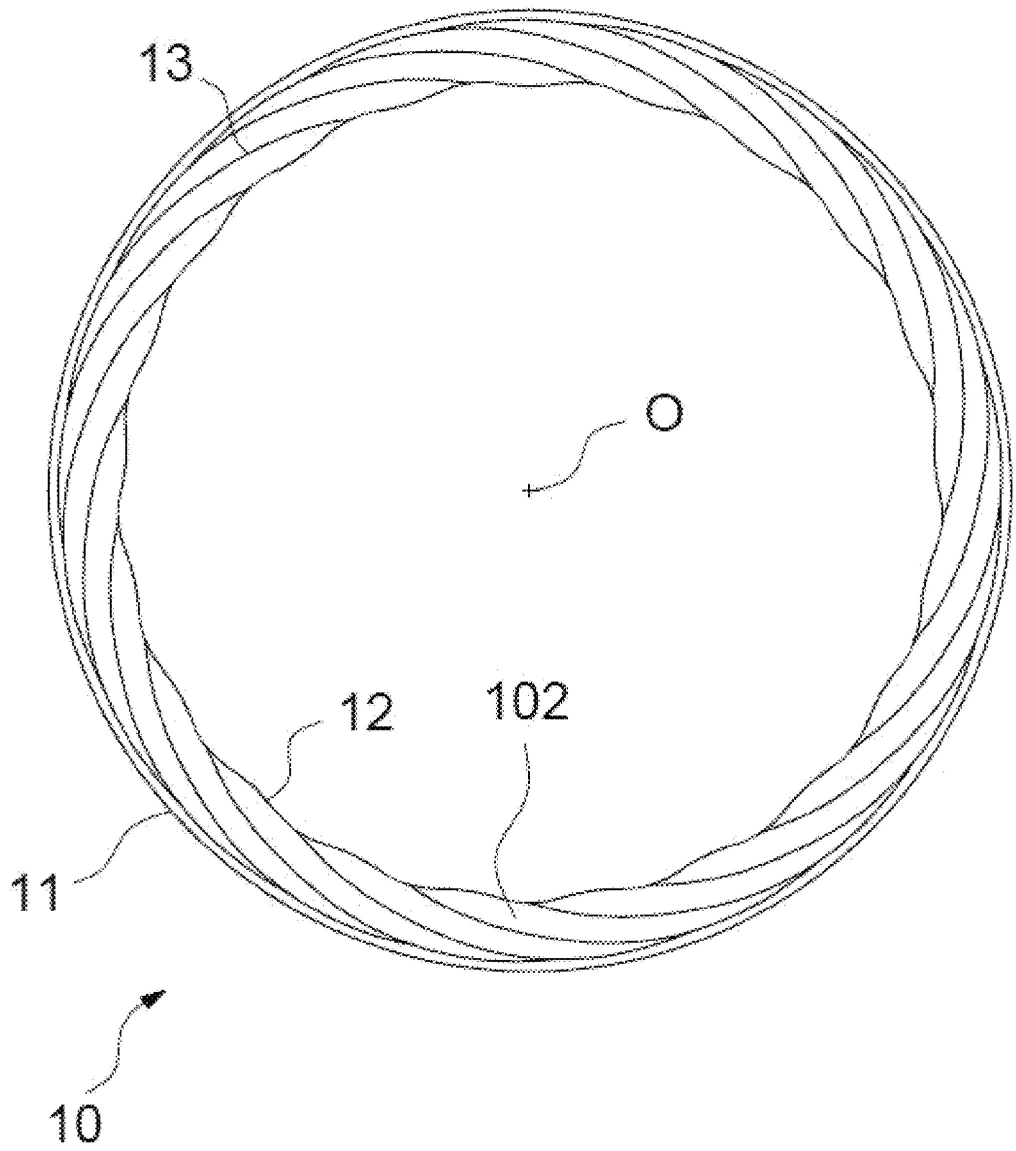
FIG. 3 is a view of the wind-breaking rim along the Y direction in FIG. 1.
Figure 4:
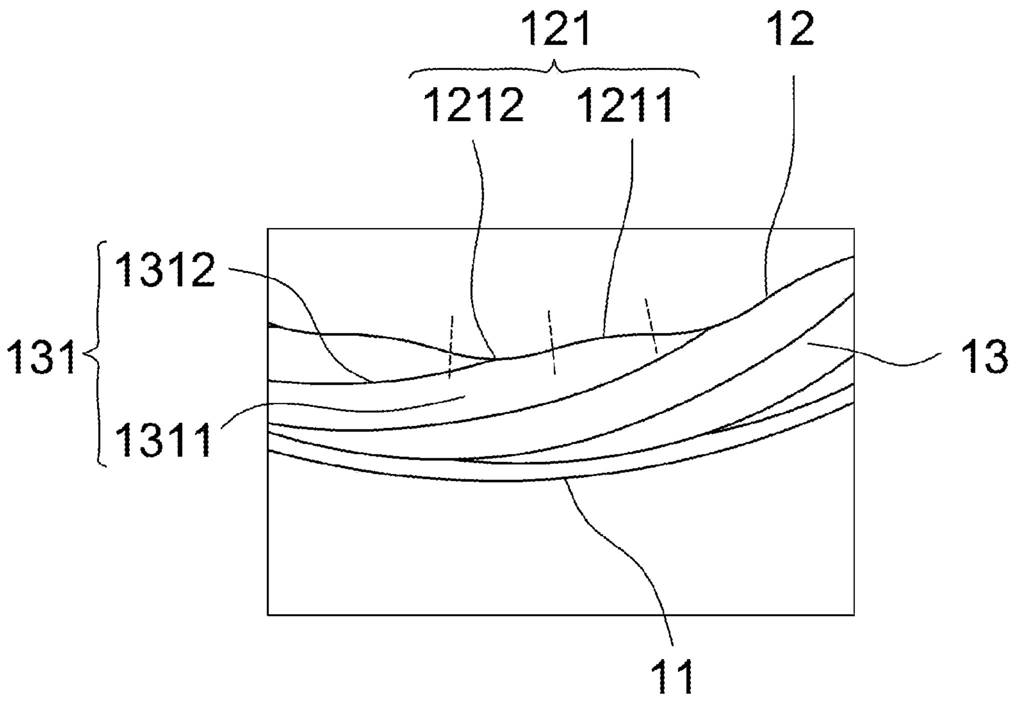
FIG. 4 is an enlarged view of C in FIG. 2.
Figure 5:
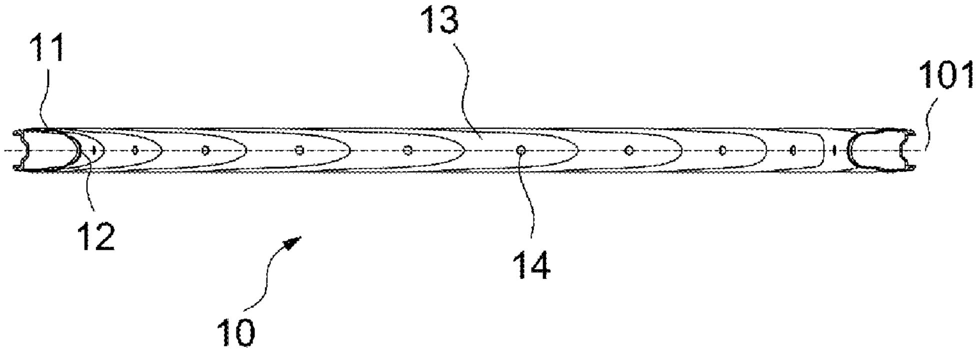
FIG. 5 is a sectional view of FIG. 2 taken along line H-H.
Figure 6:
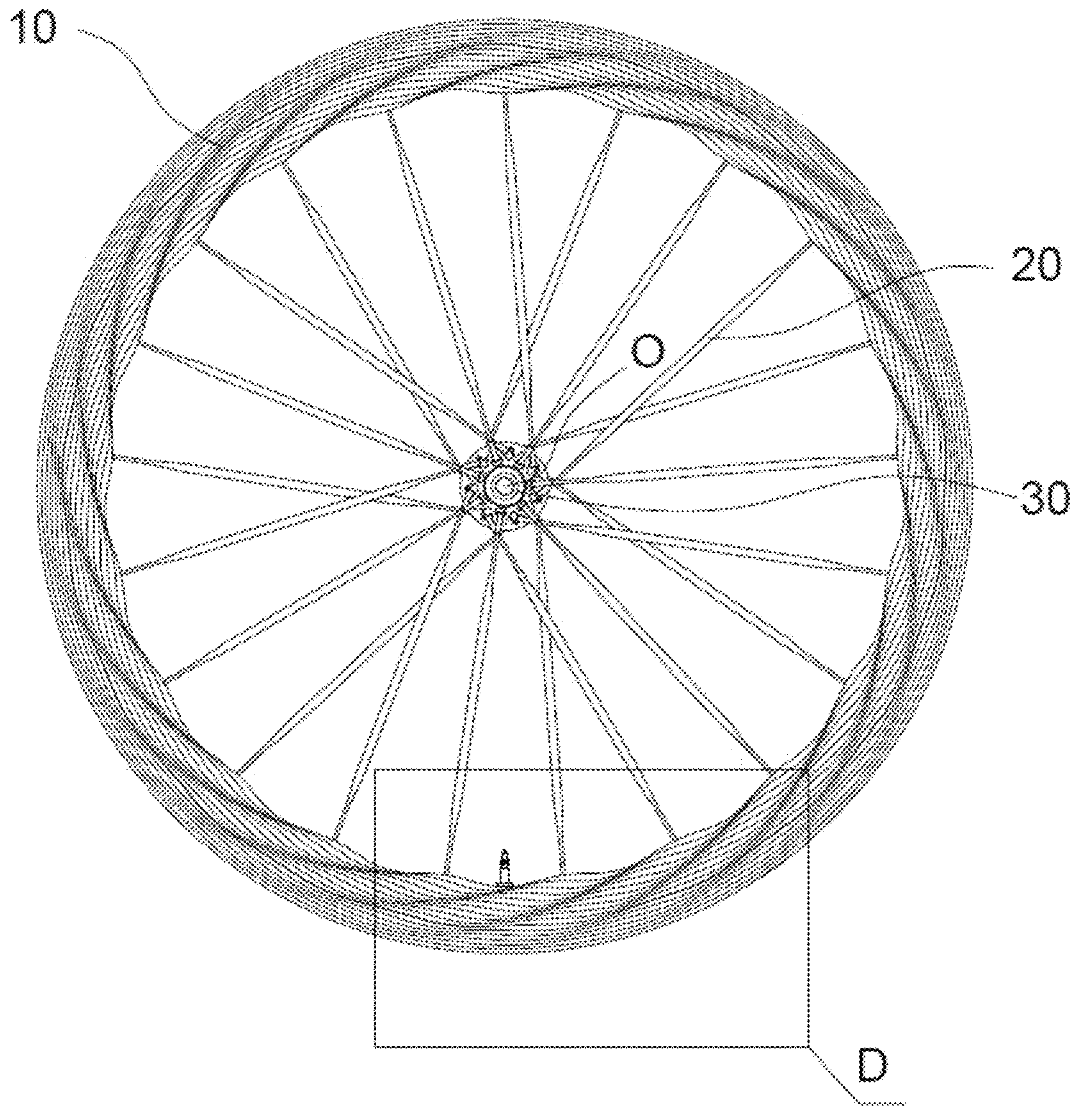
FIG. 6 is a front view of a wheel.

The rim wave profiles 102 extend from the inner ring spoke mounting portion 12 to the rim side walls 13 such that the inner ring spoke mounting portion 12 and the rim side walls 13 respectively form a concave-convex wave surface. An inner ring wave surface 121 of the inner ring spoke mounting portion 12 includes adjacent inner ring crest portions 1211 and inner ring trough portions 1212 (for boundaries between the inner ring crest portions 1211 and the inner ring trough portions 1212, reference may be made to short dashed lines in FIG. 4). A side wall wave surface 131 of the rim side wall 13 includes adjacent side wall crest portions 1311 and side wall trough portions 1312. The side wall crest portion 1311 is connected with the inner ring crest portion 1211, and the side wall trough portion 1312 is connected with the inner ring trough portion 1212. The wind-breaking rim has a central axis O of rotation, as shown in FIG. 2 to FIG. 3 and FIG. 6. Crest lines of the side wall crest portions 1311 on the side wall wave surface 131 are radial arc curves around the central axis O, as shown by curve E in FIG. 7. Trough lines of the side wall trough portions 1312 are also radial arc curves around the central axis O, as shown by curve F in FIG. 7. The radial arc curve in this example is a part of a logarithmic spiral. Of course, in other examples, the radial arc curve may also be a part of a parabola or other types of radial arc curves, or may be other types of curves that are non-radial arc curves. The crest lines and the trough lines of the radial arc curves make the air flow out more smoothly along the side walls having the wave profiles, which can further reduce the wind resistance.

Besides, the number of the rim wave profiles 102 and the distance between the adjacent rim wave profiles 102 may be adjusted specific conditions, including different numbers of spokes, different rim diameters, different wind resistance reduction coefficients, etc.

Crest lines of the side wall crest portions 1311 and trough lines of the side wall trough portions 1312 extend from the inner ring spoke mounting portion 12 to the outer ring tire mounting portion 11. A height of the side wall crest portion 1311 gradually decreases as the side wall crest portion 1311 extends from the inner ring spoke mounting portion 12 to the outer ring tire mounting portion 11 and reaches its minimum at the outer ring tire mounting portion 11. Optionally, the height of the side wall crest portion 1311 decreases to zero at the outer ring tire mounting portion 11. A height of the side wall trough portion 1312 gradually decreases as the side wall trough portion 1312 extends from the inner ring spoke mounting portion 12 to the outer ring tire mounting portion 11 and reaches its minimum at the outer ring tire mounting portion 11. Optionally, the depth of the side wall trough portion 1312 decreases to zero at the outer ring tire mounting portion 11. With this arrangement, the crests and the troughs at the outer ring tire mounting portion 11 are more gentle and even reach zero, so that the wind resistance at the outer ring tire mounting portion 11 is greatly reduced, which can further reduce the wind resistance of the whole rim.

As shown in FIG. 5 to FIG. 8, the inner ring crest portions 1211 are positions where spoke mounting holes 14 are located, i.e., the number of the inner ring crest portions 1211 is equal to the number of the spoke mounting holes 14, and the spoke mounting holes 14 are respectively located at the inner ring crest portions 1211 on the inner ring wave surface 121. With this arrangement, after the spokes are mounted to the rim, the rim has better force distribution, which can effectively prolong the service life of the rim. Moreover, the appearance of the rim is more beautiful. Optionally, an air valve is arranged at the inner ring trough portion 1212.

As shown in FIG. 10 to FIG. 13, the wind-breaking rim 10 provided by the disclosure and a rim whose side surfaces are not wavy and twisted, i.e., a control rim whose side surfaces are flat, are tested for the wind resistance at wind speeds of 20 km/h and 75 km/h respectively by Fluent simulation software. Moreover, the maximum surface wind speeds of the wind-breaking rim 10 and the control rim are simulated at the wind speeds of 20 km/h and 75 km/h respectively by Fluent simulation software. The resistance coefficient results of the rims are shown in the following table:

| Wind speed | 20 km/h | 75 km/h |
|---|---|---|
| Resistance coefficient of wind-breaking rim | 0.13268001 | 1.5840764 |
| Resistance coefficient of control rim | 0.14292097 | 1.7241974 |
| Percentage decrease of resistance coefficient of wind-breaking rim relative to control rim | 7.17% | 8.13% |

It can be clearly seen that at the wind speeds of both 20 km/h and 75 km/h, the wind-breaking rim has a low resistance coefficient, and the percentage decrease of resistance coefficient of the wind-breaking rim relative to the control rim is 7.17% and 8.13% respectively. That is, the wind-breaking rim 10 having the aforementioned profiles can significantly and effectively reduce the wind resistance.

As shown in FIG. 10 to FIG. 13, the maximum surface wind speeds of the wind-breaking rim 10 and the control rim are simulated at the wind speeds of 20 km/h and 75 km/h respectively by the Fluent simulation software. At 20 km/h, the maximum surface wind speed of the wind-breaking rim is 28.4 km/h, and the maximum surface wind speed of the control rim is 28.3 km/h. At 75 km/h, the maximum surface wind speed of the wind-breaking rim is 108 km/h, and the maximum surface wind speed of the control rim is 106.9 km/h. That is, the maximum surface wind speeds of the wind-breaking rim are respectively greater than those of the control rim, i.e., the wind-breaking rim has higher dynamic pressures on the surface. Since the resistance coefficient is inversely proportional to the dynamic pressure, the wind-breaking rim has smaller resistance coefficients, so the wind-breaking rim has smaller air resistances.

Figure 8:
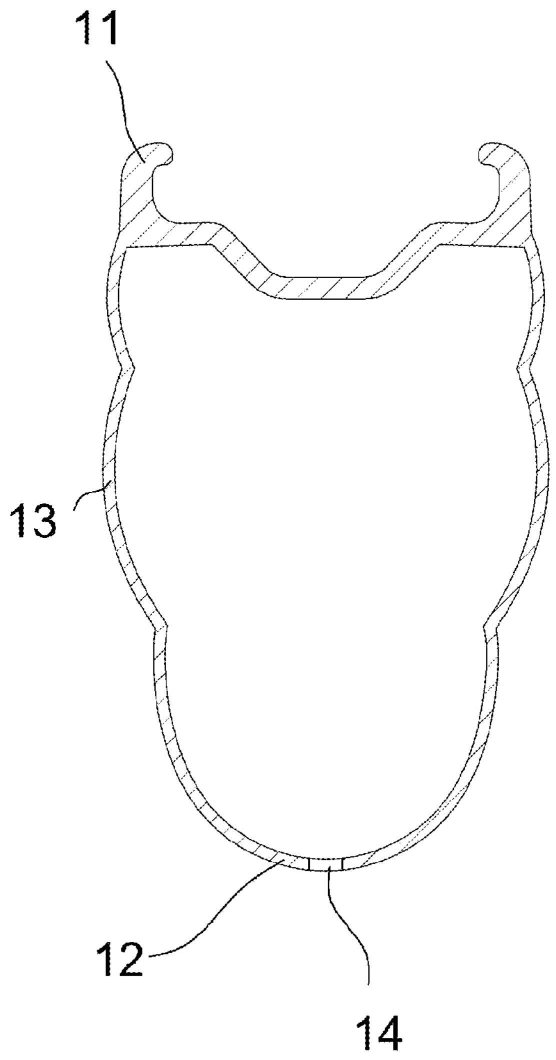
FIG. 8 is a sectional view of FIG. 2 taken along line A-A, corresponding an inner ring crest.
Figure 9:
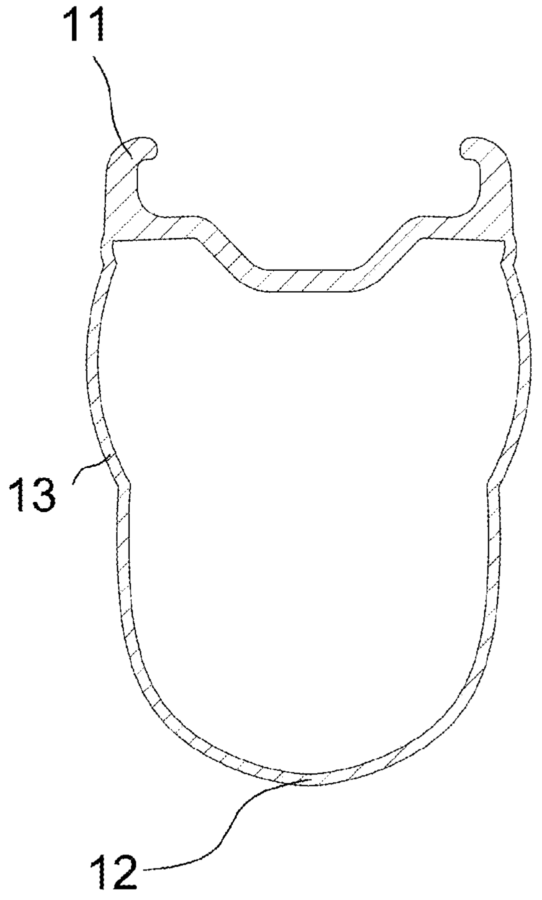
FIG. 9 is a sectional rotation view of FIG. 2 taken along line B-B, corresponding an inner ring trough.
Figure 10:
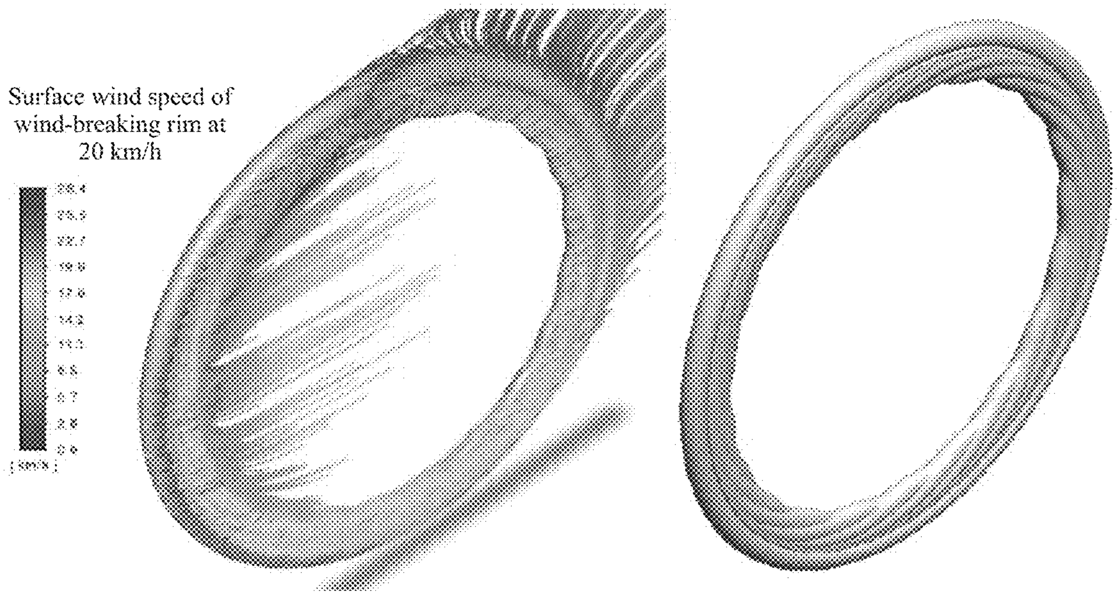
FIG. 10 is a simulation diagram showing the surface wind speed of the wind-breaking rim at 20 km/h.
Figure 11:
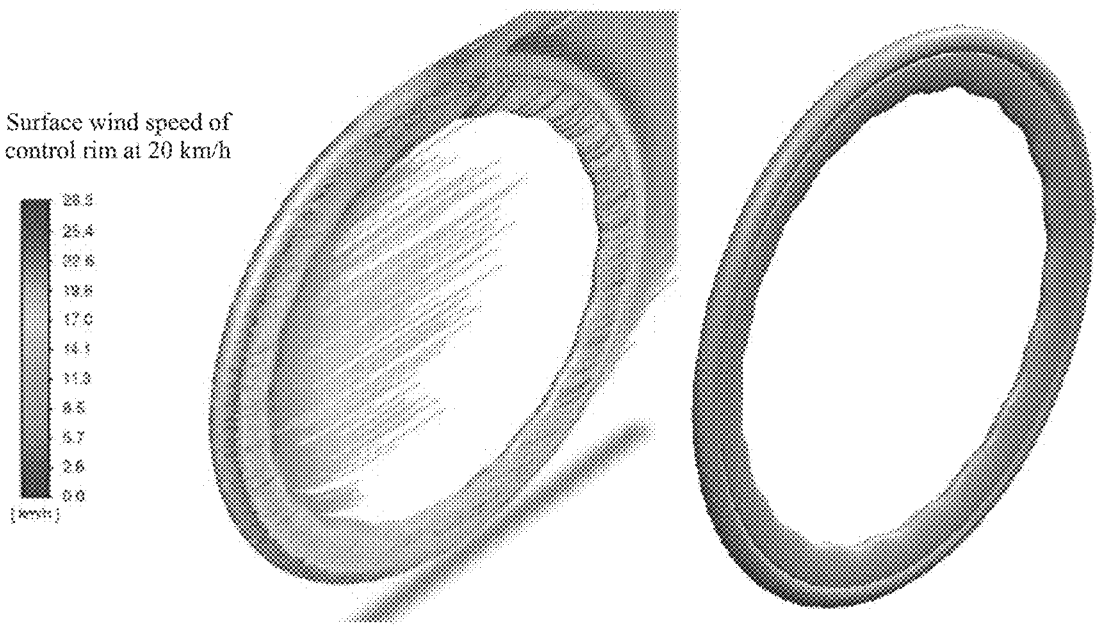
FIG. 11 is a simulation diagram showing the surface wind speed of the control rim at 20 km/h.
Figure 12:
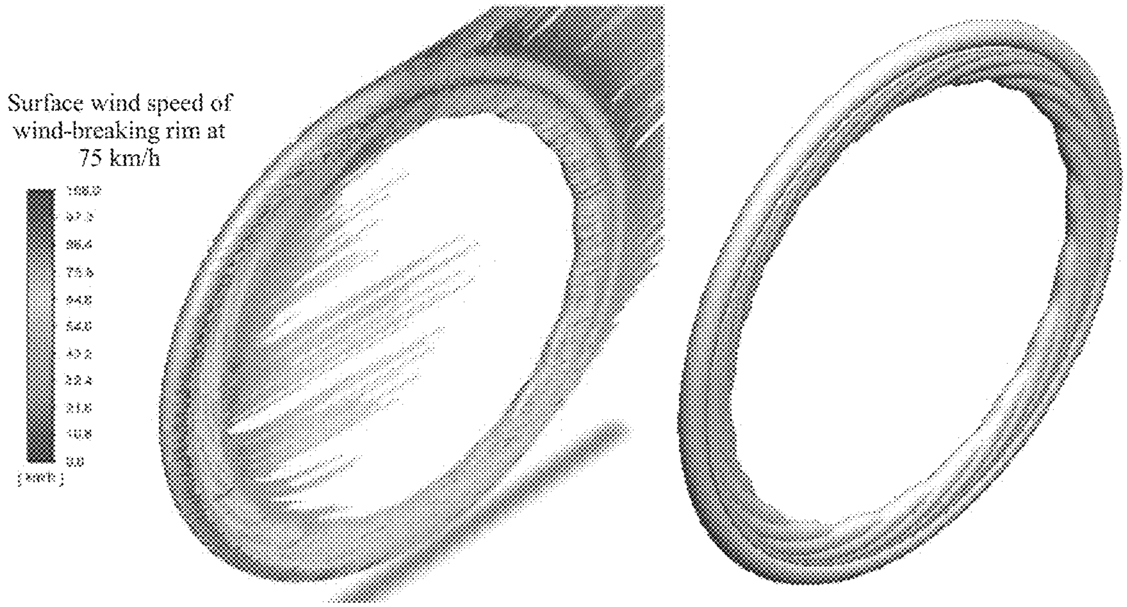
FIG. 12 is a simulation diagram showing the surface wind speed of the wind-breaking rim at 75 km/h.
Figure 13:
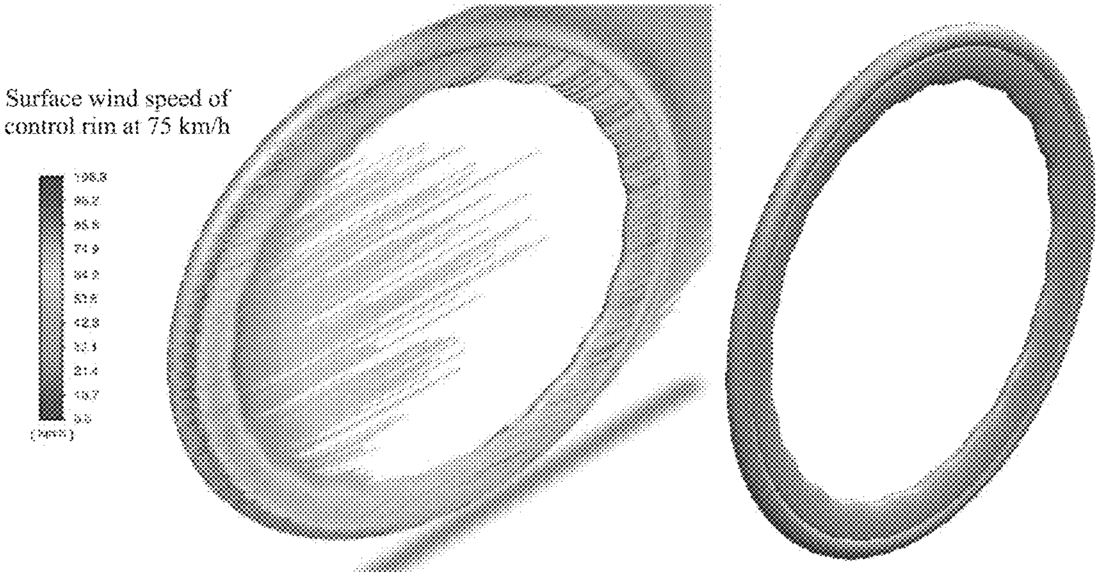
FIG. 13 is a simulation diagram showing the surface wind speed of the control rim at 75 km/h.
Figure 14:
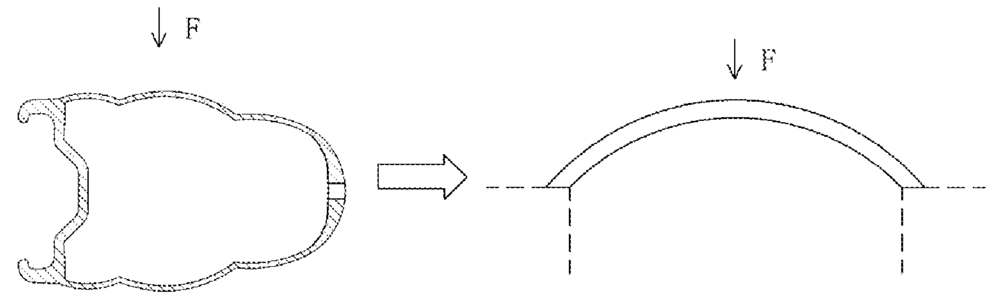
FIG. 14 is a schematic sectional equivalent diagram of rim side walls of the wind-breaking rim.
Figure 15:
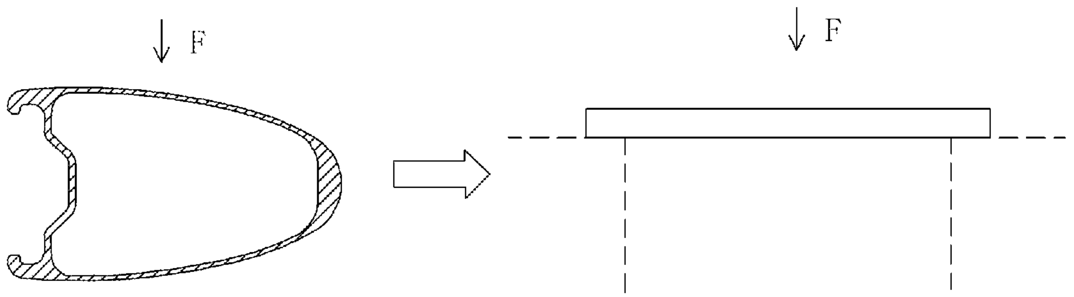
FIG. 15 is a schematic sectional equivalent diagram of rim side walls of the control rim.
Figure 16:
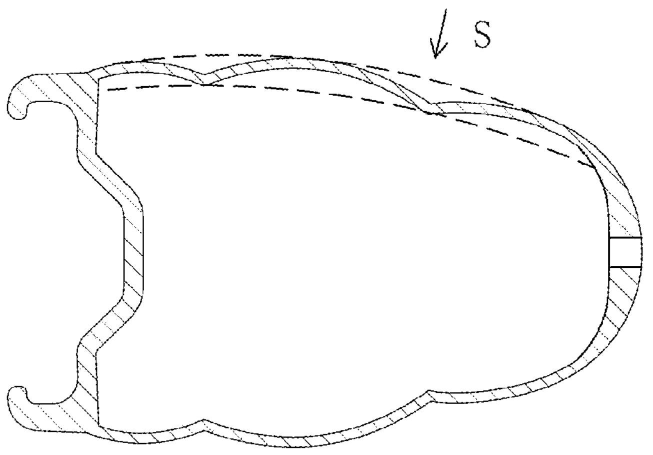
FIG. 16 is a schematic diagram of an equivalent thickness formed by the rim side walls of the wind-breaking rim.
Figure 17:
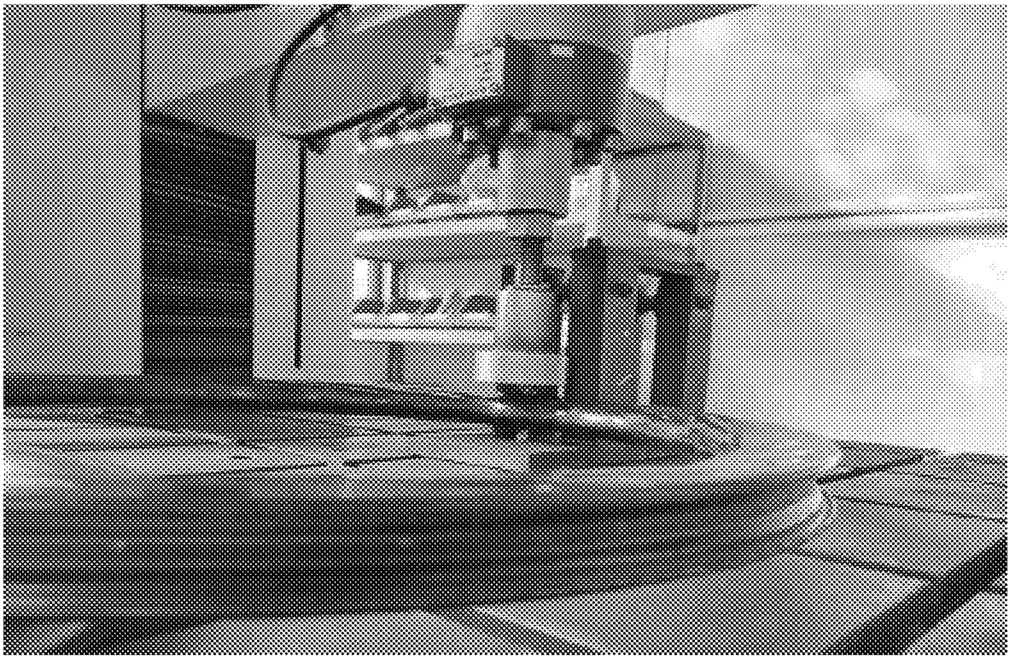
FIG. 17 is a picture of a testing machine for testing rigidity of the rim side walls.
Figure 18:
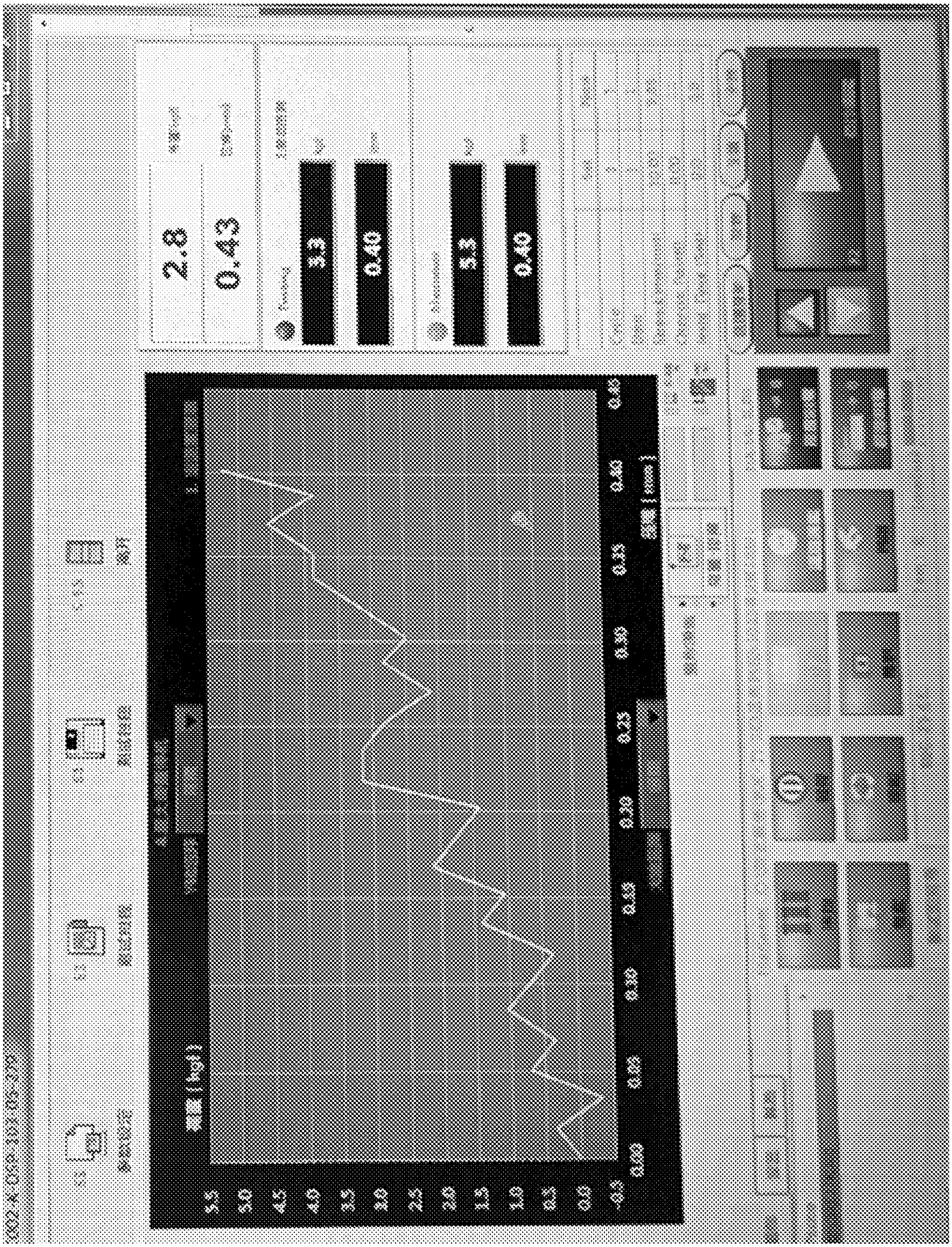
FIG. 18 is a picture showing results of a deformation test of the rim side walls of the wind-breaking rim under a load of 5.3 kg.
Figure 19:
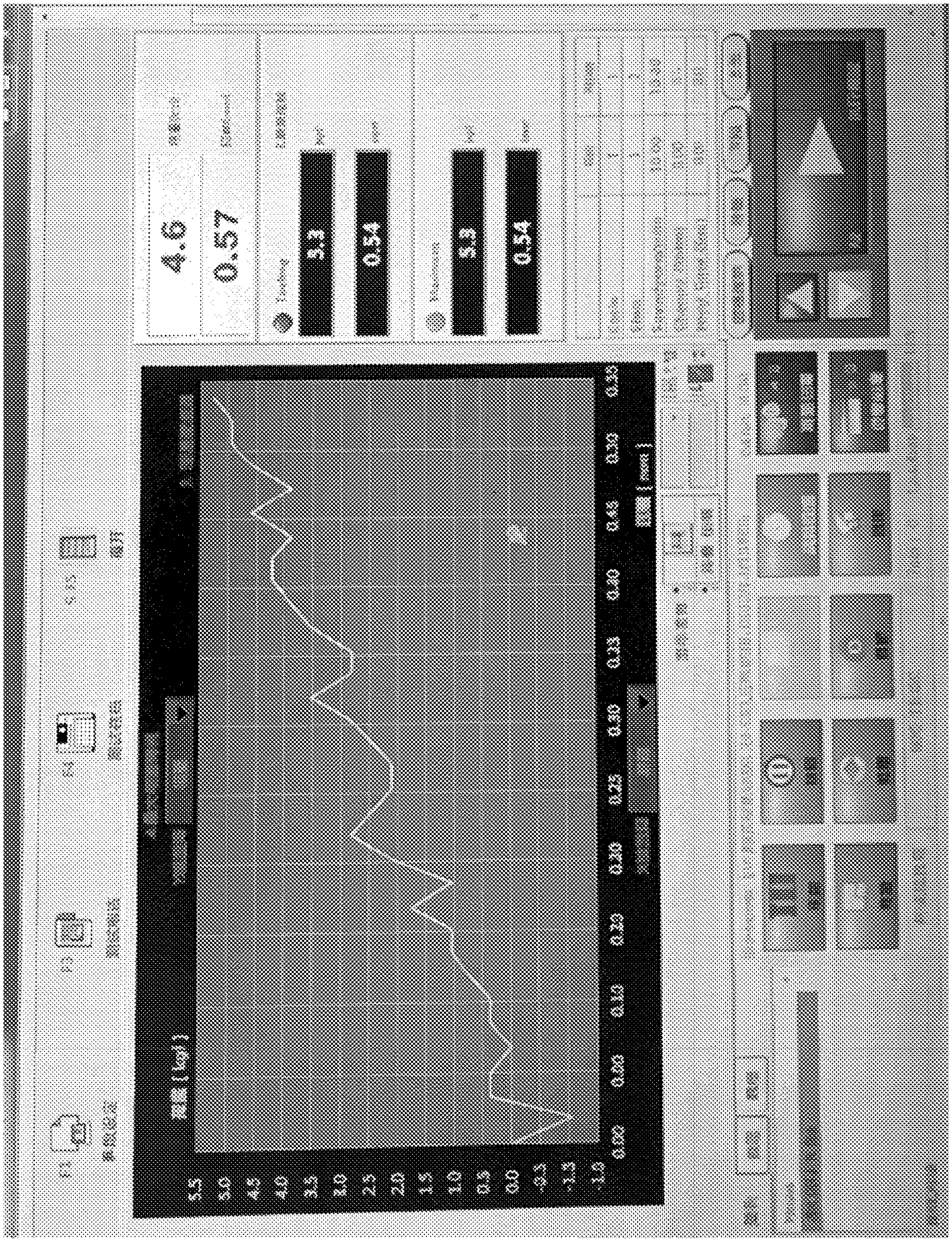
FIG. 19 is a picture showing results of a deformation test of the rim side walls of the control rim under a load of 5.3 kg.

Besides, since the rim side walls 13 of the wind-breaking rim 10 are wavy and twisted, the cross section of the rim side walls 13 form a plurality of arch-shaped protrusions, as shown in FIG. 8 to FIG. 9. Due to the existence of the arch-shaped protrusions, as shown in FIG. 14, when the wavy and twisted rim side walls 13 bear a load F, the cross section of the rim side walls 13 is equivalent to the shape of an arch bridge as shown on the right side of the arrow, so the rim side walls of the wind-breaking rim have a high bearing rigidity. Compared with the rim whose side surfaces are not wavy and twisted, i.e., the control rim whose side surfaces are flat, as shown in FIG. 15, when the rim side walls of the control rim bear the load F, the cross section of the rim side walls is equivalent to the shape of a plane as shown on the right side of the arrow. Compared with the rim side walls 13 of the wind-breaking rim 10, the rim side walls of the control rim have a lower bearing rigidity. Further, as shown in FIG. 16, the cross section of the rim side walls 13 is formed with the plurality of arch-shaped protrusions, which is approximately equivalent to increasing the thickness of the rim side walls 13 to S. The material consumed and weight of the rim side walls 13 are hardly increased or only slightly increased, but the bearing rigidity of the rim side walls of the wind-breaking rim 10 can be greatly improved. For details, reference may be made to the following test on the bearing rigidity of the rim side walls.

As shown in FIG. 14 to FIG. 16, the rim side walls of the wind-breaking rim 10 and the control rim are respectively pressed by a testing machine, and the deformations of the rim side walls are recorded. The bearing rigidity data of the rim side walls are obtained as follows:

| | Wind-breaking rim | Control rim | Percentage increase of rigidity of wind-breaking rim relative to control rim |
|---|---|---|---|
| Load applied | 5.3 kg | 5.3 kg | |
| Deformation | 0.40 mm | 0.53 mm | |
| Rigidity | 129 N/mm | 98 N/mm | +31.6% |

It can be clearly seen that when a load of 5.3 kg is applied to the rim side walls of the wind-breaking rim and the control rim respectively, the wind-breaking rim has a lower deformation, and the percentage increase of rigidity of the wind-breaking rim relative to the control rim is 31.6%. That is, the wind-breaking rim 10 having the aforementioned profiles can significantly and effectively improve the wind resistance of the rim side walls.

Figure 7:
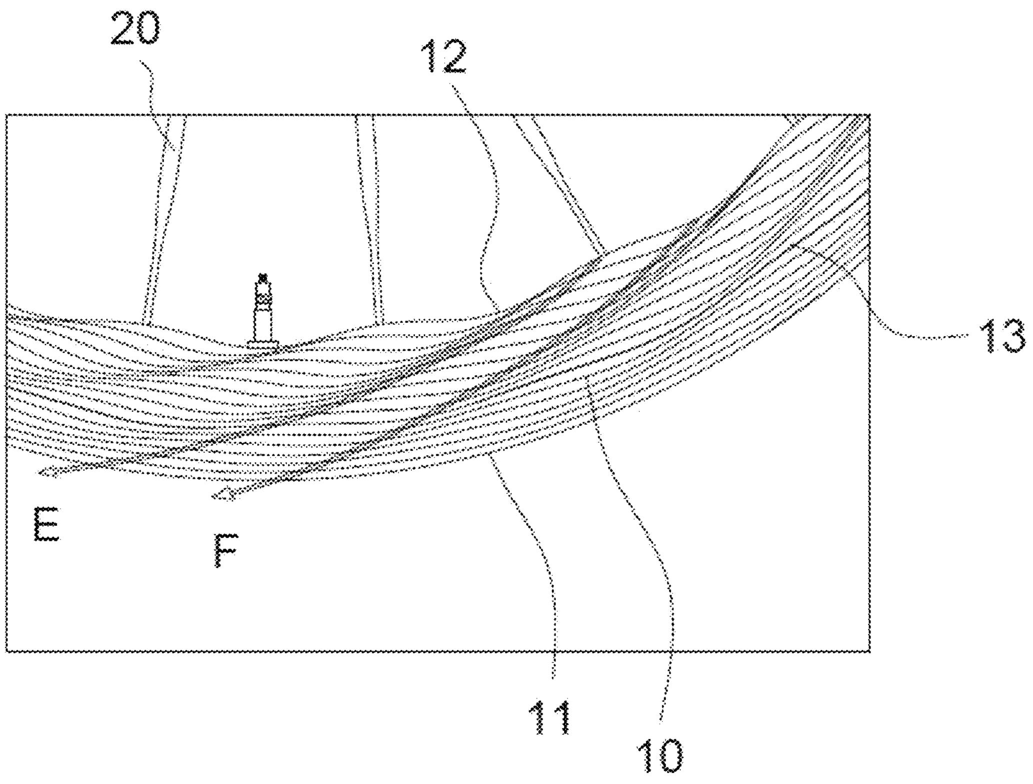
FIG. 7 is an enlarged view of D in FIG. 4.

As shown in FIG. 6 to FIG. 7, the disclosure provides a wheel, including the wind-breaking rim 10 described above and further including a hub 30 and a plurality of spokes 20. The hub 30 is located in a middle of the wind-breaking rim 10. A first end of each of the spokes 20 is connected to or integrally formed to the hub 30, and a second end of each of the spokes 20 is connected to or integrally formed to an inner ring spoke mounting portion 12.

In this example, preferably, the spokes 20 and/or the hub 30 are/is made of carbon fibers.

The disclosure provides a bicycle, including the wheel of the disclosure as described above. One or both of front and rear wheels is/are the wheel provided with the wind-breaking rim along a forward direction.

Although the disclosure has been specifically shown and described in connection with the preferred embodiments, it should be understood by those skilled in the art that various changes in form and details can be made without departing from the spirit and scope of the disclosure as defined by the appended claims, and shall all fall within the protection scope of the disclosure.

The invention claimed is:

1. A wind-breaking rim, comprising an outer ring tire mounting portion for mounting a tire, an inner ring spoke mounting portion for mounting spokes, and two rim side walls oppositely arranged between the outer ring tire mounting portion and the inner ring spoke mounting portion, the wind-breaking rim having a rim width center surface in a rim width direction, wherein the wind-breaking rim further comprises a plurality of rim wave profiles, each of the plurality of rim wave profiles extending from the inner ring spoke mounting portion to the two rim side walls and being symmetrically distributed with the rim width center surface as a plane of symmetry, the plurality of rim wave profiles being continuously arranged to form an annular wind-breaking structure, and the plurality of rim wave profiles comprising adjacent crest portions and trough portions.

2. The wind-breaking rim according to claim 1, wherein the plurality of rim wave profiles extend from the inner ring spoke mounting portion to the two rim side walls such that the inner ring spoke mounting portion and the two rim side walls respectively form a concave-convex wave surface, wherein an inner ring wave surface of the inner ring spoke mounting portion comprises adjacent inner ring crest portions and inner ring trough portions, a side wall wave surface of each of the two rim side walls comprises adjacent side wall crest portions and side wall trough portions, the side wall crest portions respectively being connected with the inner ring crest portions, and the side wall trough portions respectively being connected with the inner ring trough portions.

3. The wind-breaking rim according to claim 2, wherein the wind-breaking rim has a central axis of rotation, crest lines of the side wall crest portions are radial arc curves around the central axis, trough lines of the side wall trough portions are second radial arc curves around the central axis, and the radial arc curves and the second radial arc curves are each a part of a logarithmic spiral or a part of a parabola.

4. The wind-breaking rim according to claim 2, wherein crest lines of the side wall crest portions and trough lines of the side wall trough portions extend from the inner ring spoke mounting portion to the outer ring tire mounting portion, a height of the side wall crest portions decreasing as the side wall crest portions extend from the inner ring spoke mounting portion to the outer ring tire mounting portion, and a depth of the side wall trough portions decreasing as the side wall trough portions extends from the inner ring spoke mounting portion to the outer ring tire mounting portion.

5. The wind-breaking rim according to claim 4, wherein the height of the side wall crest portions decreases to zero at the outer ring tire mounting portion, and the depth of the side wall trough portions decreases to zero at the outer ring tire mounting portion.

6. The wind-breaking rim according to claim 2, wherein spoke mounting holes are each respectively located at the inner ring crest portions.

7. The wind-breaking rim according to claim 1, wherein the outer ring tire mounting portion, inner ring spoke mounting portion and the two rim side walls form a cavity and are integrally formed.

8. The wind-breaking rim according to claim 7, wherein the outer ring tire mounting portion, the inner ring spoke mounting portion and the two rim side walls are made of carbon fibers.

9. A wheel, comprising the wind-breaking rim according to claim 1 and further comprising a hub and a plurality of spokes, wherein the hub is located in a middle of the wind-breaking rim, a first end of each of the plurality of spokes is connected to or integrally formed to the hub, and a second end of each of the plurality of spokes is connected to or integrally formed to the inner ring spoke mounting portion.

10. A bicycle, comprising the wheel according to claim 9.

* * * * *